(12) United States Patent
Wang et al.

(10) Patent No.: US 7,088,547 B1
(45) Date of Patent: Aug. 8, 2006

(54) DISK DRIVE RECURSIVELY ESTIMATING REPEATABLE RUNOUT

(75) Inventors: Zhi Wang, San Jose, CA (US); Jenghung Chen, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/188,914

(22) Filed: Jul. 25, 2005

(51) Int. Cl.
*G11B 5/596* (2006.01)

(52) U.S. Cl. .................................... 360/77.04
(58) Field of Classification Search ............ None
See application file for complete search history.

(56) References Cited

U.S. PATENT DOCUMENTS

| | | | |
|---|---|---|---|
| 5,550,685 A | 8/1996 | Drouin | |
| 5,585,976 A | 12/1996 | Pham | |
| 5,793,559 A | 8/1998 | Shepherd et al. | |
| 5,825,578 A | 10/1998 | Shrinkle et al. | |
| 6,049,440 A | 4/2000 | Shu | |
| 6,097,565 A | 8/2000 | Sri-Jayantha et al. | |
| 6,141,175 A | 10/2000 | Nazarian et al. | |
| 6,654,198 B1 | 11/2003 | Liu et al. | |
| 6,847,503 B1 | 1/2005 | Zhang et al. | |
| 6,999,267 B1 * | 2/2006 | Melkote et al. | 360/77.04 |
| 2003/0193736 A1 * | 10/2003 | Min et al. | 360/77.04 |
| 2004/0246619 A1 * | 12/2004 | Zhang | 360/77.04 |

* cited by examiner

*Primary Examiner*—Andrew L. Sniezek
(74) *Attorney, Agent, or Firm*—Howard H. Sheerin, Esq.

(57) ABSTRACT

A disk drive is disclosed comprising control circuitry for generating a control signal applied to a VCM in response to a position error signal (PES) generated from reading embedded servo sectors and a feed-forward compensation value that compensates for a repeatable runout (RRO) disturbance. The feed-forward compensation value is generated for each servo sector in response to an RRO estimate $\hat{S}$ computed recursively for each servo sector according to:

$$\hat{S}_{n+1} = \hat{S}_n - \lambda \left[ \hat{S}_n - \frac{1}{n} \sum_{i=1}^{n} PES_i \right]$$

wherein: $\lambda$ is a predetermined fraction;
$PES_i$ is the position error signal generated for a selected servo sector during an ith revolution of the disk; and
n represents a number of disk revolutions.

12 Claims, 5 Drawing Sheets

FIG. 1C  $\hat{s}_{n+1} = \hat{s}_n - \lambda [\hat{s}_n - \frac{1}{n}\sum_{i=1}^{n} PES_i]$

DISK DRIVE RECURSIVELY ESTIMATING REPEATABLE RUNOUT

BACKGROUND OF THE INVENTION

1. Field of the Invention

The present invention relates to disk drives for computer systems. More particularly, the present invention relates to a disk drive recursively estimating repeatable runout (RRO).

2. Description of the Prior Art

Repeatable runout (RRO) in a disk drive is a disturbance in the servo system which can degrade performance by disrupting the head's centerline tracking during read and write operations. The RRO disturbance is typically caused by physical imperfections in the disk drive such as spindle motor runout, disk slippage, disk warping, media defects, and imperfections in the electromechanical servoing mechanism including the mechanism for writing embedded servo sectors onto the disk during manufacturing. Because the imperfections that cause RRO are relatively static, RRO is a predictable disturbance that is periodic with the rotation of the disk. It is known in the industry to estimate and cancel out the periodic RRO disturbance by introducing a feed-forward compensation signal into the servo loop.

Prior art techniques typically estimate the RRO disturbance by averaging the position error signal (PES) over many revolutions of the disk in order to average out other noise sources (the non-repeatable runout), and then backing out the effect of the servo compensator. The RRO disturbance is estimated during a manufacturing process, wherein a feed-forward compensation value is generated and stored for each servo sector of each track. However, estimating the RRO disturbance for every track over multiple revolutions of the disk can increase significantly the manufacturing time of the disk drive.

There is, therefore, a need for a fast, accurate technique for estimating the RRO disturbance in a disk drive to reduce the manufacturing time.

SUMMARY OF THE INVENTION

The present invention may be regarded as a disk drive comprising a disk having a plurality of data tracks, wherein each data track comprises a plurality of data sectors and a plurality of embedded servo sectors. A head coupled to a distal end of an actuator arm is rotated by a voice coil motor (VCM) about a pivot to actuate the head over the disk. Control circuitry generates a control signal applied to the VCM in response to a position error signal (PES) generated from reading the embedded servo sectors and a feed-forward compensation value that compensates for a repeatable runout (RRO) disturbance. The feed-forward compensation value is generated for each servo sector in response to an RRO estimate $\hat{S}$ computed recursively for each servo sector according to:

$$\hat{S}_{n+1} = \hat{S}_n - \lambda \left[ \hat{S}_n - \frac{1}{n} \sum_{i=1}^{n} PES_i \right]$$

wherein:
$\lambda$ is a predetermined fraction;
$PES_i$ is the position error signal generated for a selected servo sector during an ith revolution of the disk; and
n represents a number of disk revolutions.

In one embodiment, the RRO estimate $\hat{S}$ is computed recursively over a predetermined number of disk revolutions. In another embodiment, the RRO estimate $\hat{S}$ is computed recursively over a number of disk revolutions until the change in the RRO estimate $\hat{S}$ falls below a predetermined threshold.

In yet another embodiment, the disk comprises a plurality of zones, wherein each zone comprises a plurality of the data tracks, and the RRO estimate $\hat{S}$ is computed for each data track in each zone using a $\lambda$ fraction corresponding to each zone.

In still another embodiment, the RRO estimate $\hat{S}$ is computed recursively for each data track during a manufacturing process.

In another embodiment, the RRO estimate $\hat{S}$ is computed recursively for a selected data track if the PES generated for the selected data track exceeds a predetermined threshold during normal operation of the disk drive.

The present invention may also be regarded as a method of operating a disk drive, the disk drive comprising a disk having a plurality of data tracks, wherein each data track comprises a plurality of data sectors and a plurality of embedded servo sectors, an actuator arm, a head coupled to a distal end of the actuator arm, and a voice coil motor (VCM) for rotating the actuator arm about a pivot in order to actuate the head over the disk. A control signal applied to the VCM is generated in response to a position error signal (PES) generated from reading the embedded servo sectors and a feed-forward compensation value that compensates for a repeatable runout (RRO) disturbance. The feed-forward compensation value is generated for each servo sector in response to an RRO estimate $\hat{S}$ computed recursively for each servo sector according to:

$$\hat{S}_{n+1} = \hat{S}_n - \lambda \left[ \hat{S}_n - \frac{1}{n} \sum_{i=1}^{n} PES_i \right]$$

wherein:
$\lambda$ is a predetermined fraction;
$PES_i$ is the position error signal generated for a selected servo sector during an ith revolution of the disk; and
n represents a number of disk revolutions.

BRIEF DESCRIPTION OF THE DRAWINGS

FIG. 1C shows an equation according to an embodiment of the present invention for computing the RRO estimate $\hat{S}$.

DESCRIPTION OF THE PREFERRED EMBODIMENTS

Figures 1A, 1B:
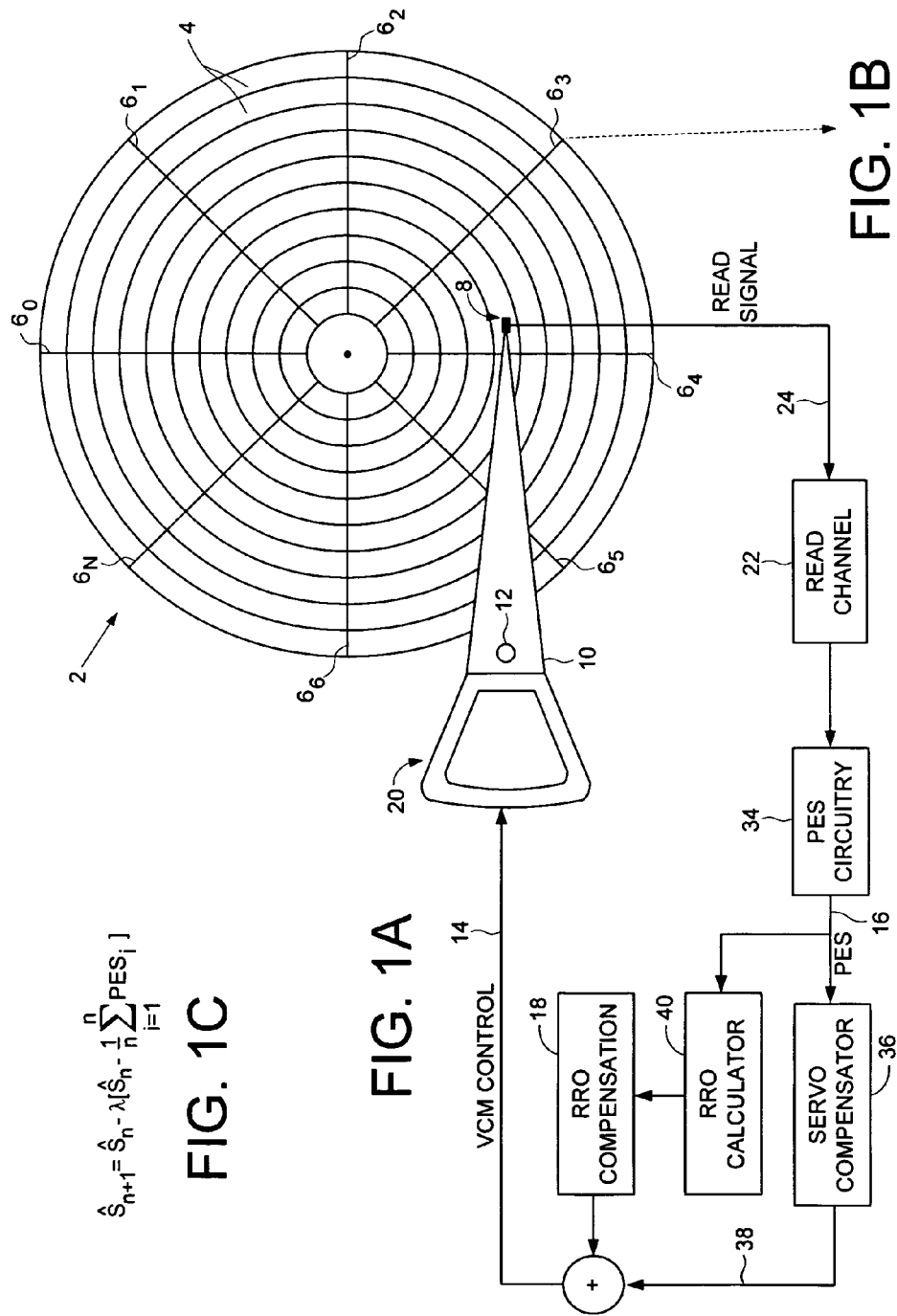
FIG. 1A shows a disk drive according to an embodiment of the present invention comprising an RRO compensation calculator for calculating an RRO estimate $\hat{S}$ and corresponding feed-forward compensation value.
FIG. 1B shows an example format for an embedded servo sector for generating a position error signal (PES) used to compute the feed-forward compensation value.

FIG. 1A shows a disk drive according to an embodiment of the present invention comprising a disk 2 having a plurality of data tracks 4, wherein each data track comprises a plurality of data sectors and a plurality of embedded servo sectors $6_0$–$6_N$. A head 8 coupled to a distal end of an actuator arm 10 is rotated by a voice coil motor (VCM) about a pivot 12 to actuate the head 8 over the disk 2. Control circuitry generates a control signal 14 applied to the VCM in response to a position error signal (PES) 16 generated from reading the embedded servo sectors $6_0$–$6_N$ and a feed-forward compensation value 18 that compensates for a repeatable runout (RRO) disturbance. The feed-forward compensation value 18 is generated for each servo sector $6_0$–$6_N$ in response to an RRO estimate Ŝ computed recursively for each servo sector $6_0$–$6_N$ according to the equation shown in FIG. 1C:

$$\hat{S}_{n+1} = \hat{S}_n - \lambda \left[ \hat{S}_n - \frac{1}{n} \sum_{i=1}^{n} PES_i \right]$$

wherein:

λ is a predetermined fraction;

$PES_i$ is the position error signal generated for a selected servo sector during an ith revolution of the disk; and n represents a number of disk revolutions.

In the embodiment of FIG. 1A, the VCM comprises a voice coil 20 that is energized by current in response to the control signal 14. The voice coil 20 generates a magnetic flux which interacts with the magnetic flux of permanent magnets (not shown) creating a torque that rotates the actuator arm 10 about the pivot 12.

Figure 1D:
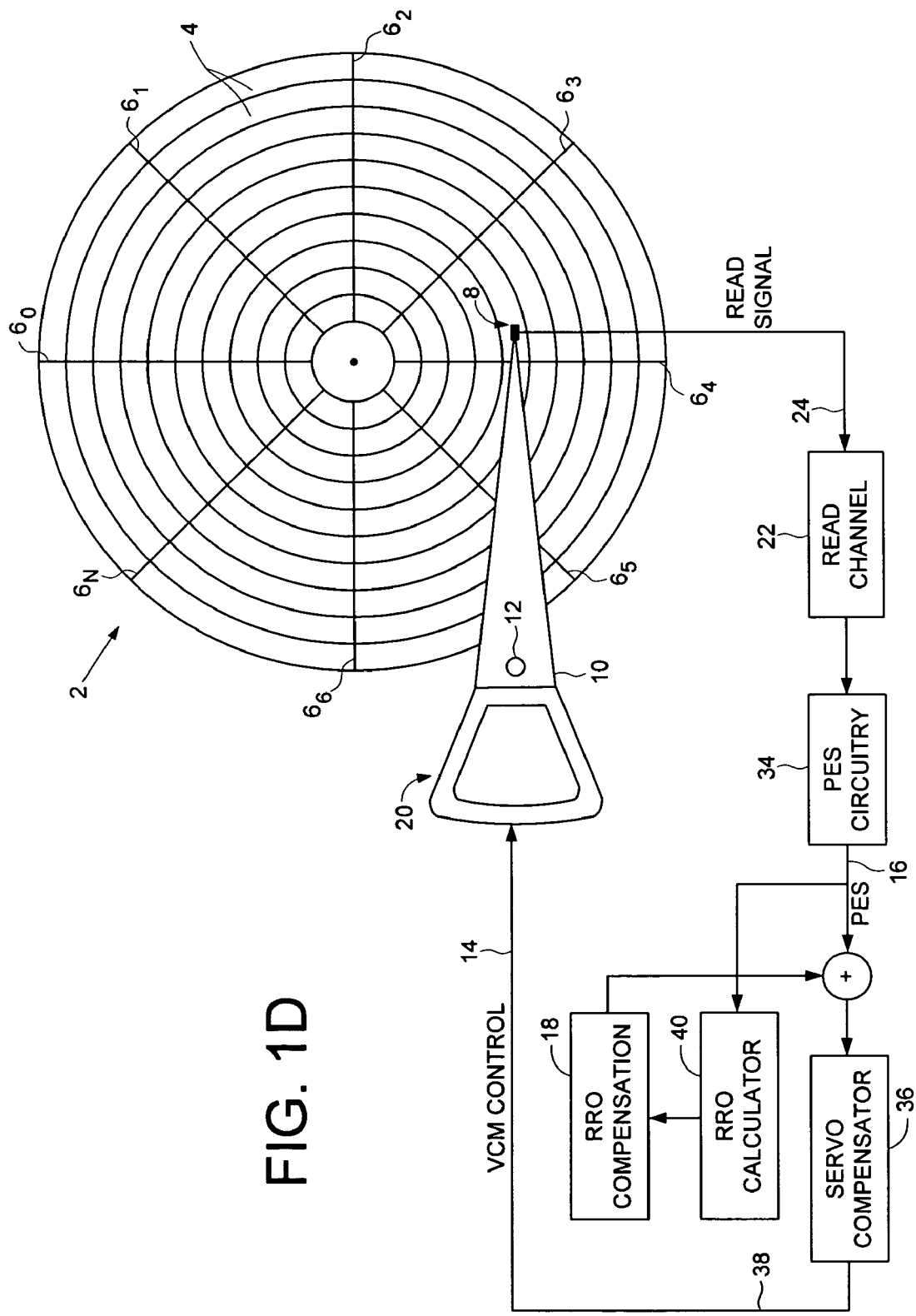
FIG. 1D shows an alternative embodiment of the present invention wherein the feed-forward compensation value is used to modify the PES input into the servo compensator.

The control circuitry in the embodiment of FIG. 1A includes a read channel 22 for demodulating the read signal 24 emanating from the head 8, including to demodulate the data in the embedded servo sectors $6_0$–$6_N$. FIG. 1B shows an example format of an embedded servo sector 63 comprising a preamble 26, a sync mark 28, servo data 30, and servo bursts 32. The preamble 26 synchronizes timing recovery and gain control within the read channel 22, and the sync mark 28 bit synchronizes the servo data 30. The servo data 30 comprises a track address for generating a coarse position for the head 8, and the servo bursts 32 comprise groups of high frequency transitions recorded at precise offsets for generating a fine position of the head 8 with respect to the centerline of the target track. The read channel 22 demodulates the servo data 30 (track address) and servo bursts 32 provided to PES circuitry 34 for calculating the PES 16 as a difference between the current radial location of the head 8 and a target location. The PES 16 is processed by a servo compensator 36 to generate a control signal 38 added to the feed-forwarded compensation value 18 to generate the VCM control signal 14 applied to the voice coil 20. In an alternative embodiment shown in FIG. 1D, the feed-forward compensation value 18 is used to modify the PES 16 input into the servo compensator 36 rather than modify the output of the servo compensator 36.

During a manufacturing process of the disk drive, an RRO calculator 40 computes recursively the RRO estimate Ŝ in response to the PES 16 using the equation shown in FIG. 1C for each servo sector $6_0$–$6_N$. The RRO calculator then computes the feed-forward compensation value 18 for each servo sector $6_0$–$6_N$ by backing out the effect of the servo compensator 36 from the RRO estimate Ŝ. Any suitable technique may be employed to back out the effect of the servo compensator 36, including to implement an inverse convolution operation. A feed-forward compensation value 18 is computed for each servo sector $6_i$ in each data track 4 over a number of revolutions of the disk 2. During normal operation, the feed-forward compensation value 18 for each servo sector compensates for the RRO disturbance by modifying the servo algorithm, for example, by modifying the input (FIG. 1D) or output (FIG. 1A) of the servo compensator 36. As described below with reference to FIG. 3, the equation of FIG. 1C converges faster to a suitable RRO estimate over a fewer number of disk revolutions as compared to the prior art technique of simply averaging the PES 16.

Figure 2:
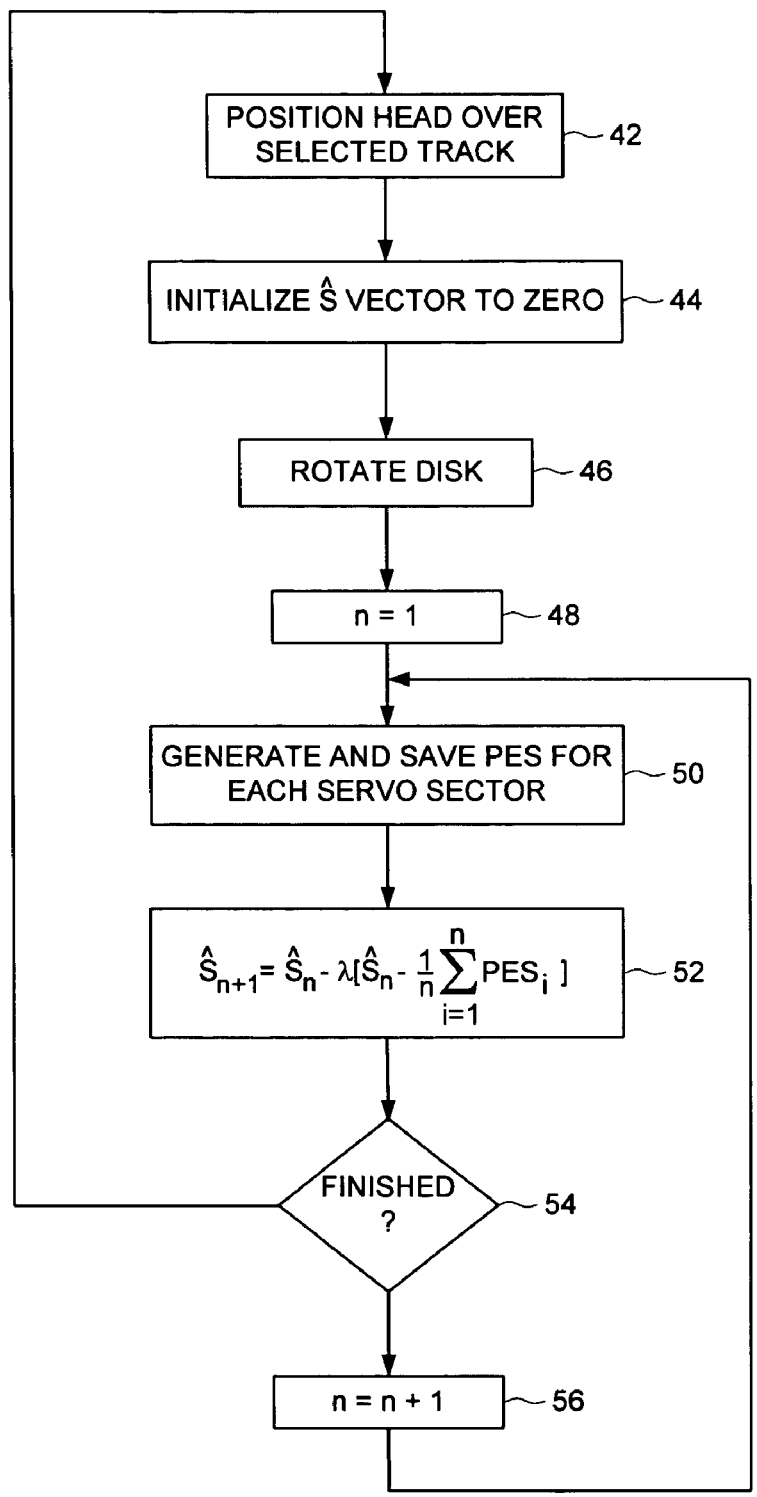
FIG. 2 is a flow diagram for generating the RRO estimate $\hat{S}$ and corresponding feed-forward compensation value for each servo sector recorded in each servo track on the disk.

FIG. 2 is a flow diagram according to an embodiment of the present invention for recursively computing the RRO estimate Ŝ for each servo sector $6_i$ in each data track 4. At step 42 the head 8 is positioned over a selected data track, and at step 44 the vector of RRO estimates Ŝ corresponding to the servo sectors $6_0$–$6_N$ is initialized to zero. At step 46 the disk 2 is rotated and at step 48 a counter n is initialized to zero. During a revolution of the disk 2, at step 50 a PES 16 is generated at each servo sector 6 in response to the servo data 30 and servo bursts 32 (FIG. 1B). The PES is stored at step 50 for use in step 52 for updating the RRO estimate Ŝ for each servo sector $6_0$–$6_N$ using the equation of FIG. 1C for the current revolution of the disk (as tracked by counter n). If at step 54 more revolutions are needed to compute the RRO estimate Ŝ, at step 56 the counter n is incremented and the process is repeated starting at step 50. In one embodiment, the process terminates at step 54 after a predetermined number of disk revolutions (i.e., when n reaches a predetermined value). In an alternative embodiment, the process terminates at step 54 when the change in the RRO estimate Ŝ falls below a predetermined threshold (indicating further revolutions will provide only a marginal improvement in accuracy). The entire flow diagram of FIG. 2 is then repeated starting at step 32 for the next data track 4 until the entire disk 2 is processed.

How the equation of FIG. 1C converges to an accurate RRO estimate is better understood by subtracting the true RRO S from both sides of the equation and defining an estimation error as $\tilde{S}_n = \hat{S}_n - S$. The equation of FIG. 1C can then be re-written as:

$$\tilde{S}_{n+1} = \tilde{S}_n - \lambda \left[ \tilde{S}_n + S - \frac{1}{n} \sum_{i=1}^{n} PES_i \right] \text{ or }$$

$$\tilde{S}_{n+1} = (1-\lambda)\tilde{S}_n - \lambda \left[ \tilde{S} - \frac{1}{n} \sum_{i=1}^{n} PES_i \right]$$

The above equation can be written in the Z-domain as:

$$\hat{S}(z) = \Phi(z)E(z)$$

where:

$$\Phi(z) = \frac{-\lambda}{z - (1 - \lambda)} \text{ and } E(z) = Z\left\{S - \frac{1}{n}\sum_{i=1}^{n} PES_i\right\}.$$

Figure 3:
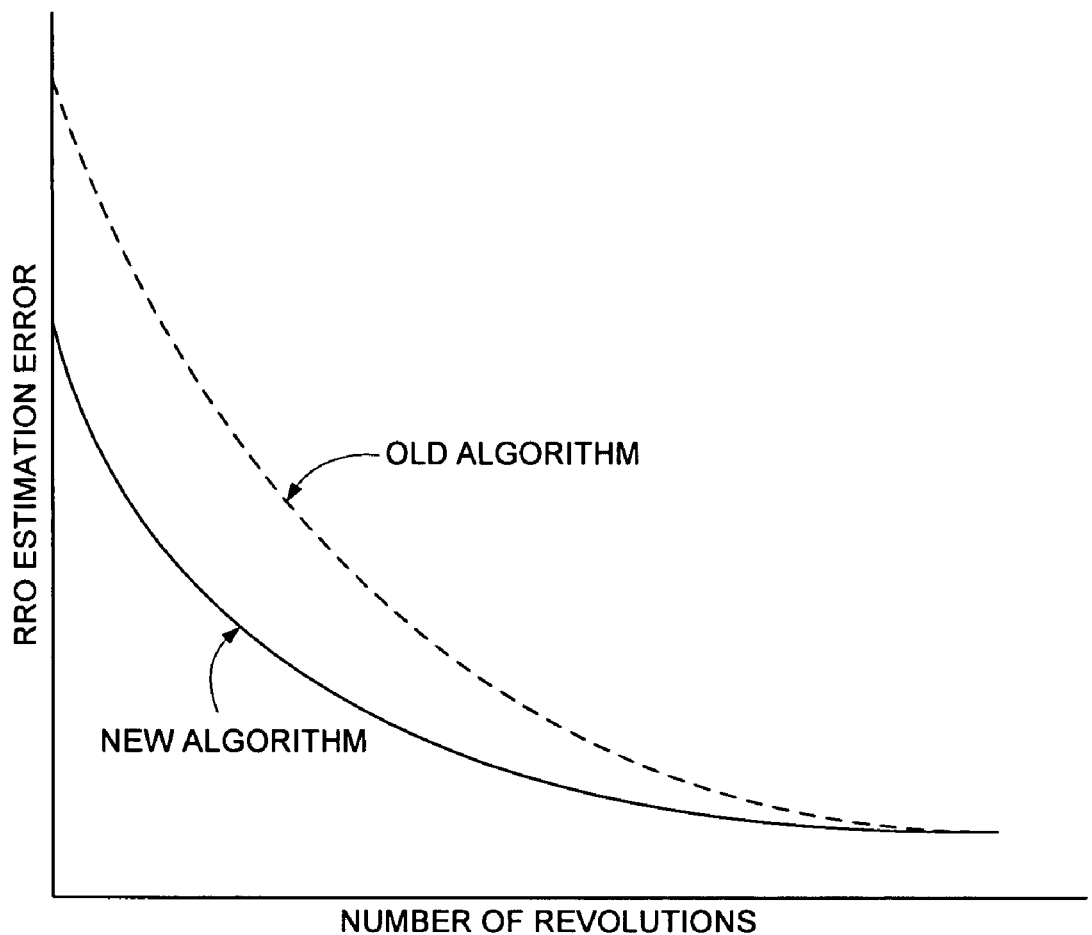
FIG. 3 illustrates how the equation of FIG. 1C converges to an accurate RRO estimate $\hat{S}$ faster than the prior art technique of averaging the PES.

Accordingly, the estimation error $\hat{S}(z)$ is a function of $\Phi(z)$ (a first order filter) and $E(z)$ which represents the conventional RRO estimation error generated by simply averaging the PES over a number of disk revolutions. By selecting an appropriate value for $\lambda$, the estimation error decreases faster than the conventional RRO estimation technique. This is illustrated in FIG. 3 which shows that the estimation error generated using the new algorithm of FIG. 1C decreases faster over fewer number of disk revolutions as compared to the old algorithm. Both algorithms eventually converge to the same estimation error as the number of disk revolutions becomes very large.

In one embodiment the disk 2 is partitioned into a number of zones, wherein each zone comprises a plurality of the data tracks 4, and the RRO estimate $\hat{S}$ is computed for each data track in each zone using a $\lambda$ corresponding to each zone. In one embodiment, a suitable $\lambda$ is determined for each zone by evaluating a number of different $\lambda$ settings for a subset of disk drives out of a family of disk drives. A nominal/for each zone is then used to generate the RRO estimate for each production disk drive during the manufacturing process.

Figure 4:
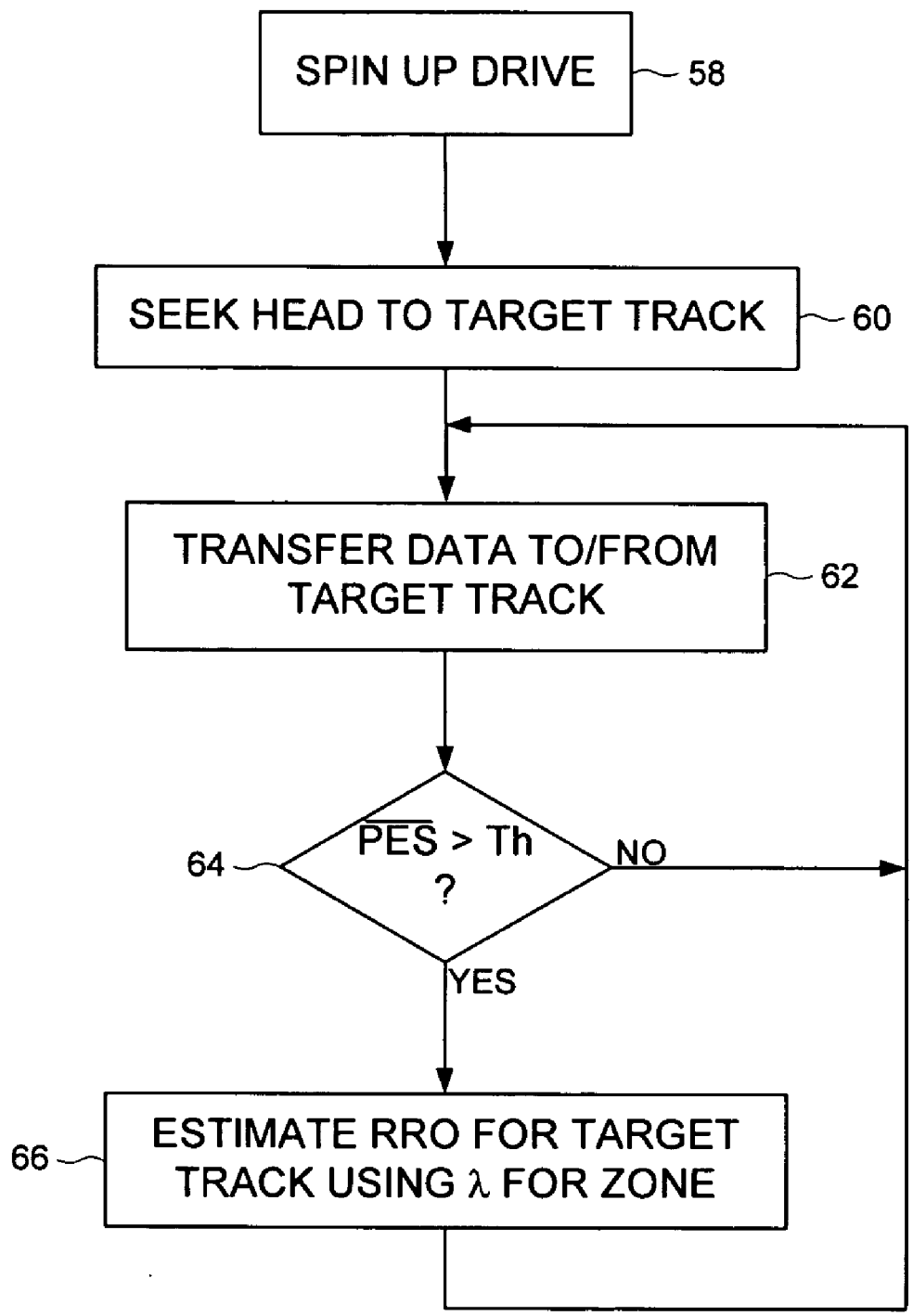
FIG. 4 is a flow diagram according to an embodiment of the present invention wherein the RRO estimate Ŝ is updated while the disk drive is in the field if the PES (or average PES) exceeds a predetermined threshold.

In another embodiment, the RRO estimate $\hat{S}$ and corresponding feed-forward compensation value 18 is updated while the disk drive is in the field if the PES 16 (or average PES 16) exceeds a predetermined threshold. This embodiment is illustrated in FIG. 4 wherein at step at step 58 the disk drive is spun up, and at step 60 the head is positioned over a target data track. At step 62, the disk drive performs a read/write operation by servoing the head 8 in response to the PES 16 and transferring data to/from the target data track. If at step 64 the average PES 16 exceeds a predetermined threshold, then at step 66 the RRO estimate $\hat{S}$ (and corresponding feed-forward compensation value 18) is updated using the $\lambda$ for the zone the target track is located. In one embodiment, the RRO estimate $\hat{S}$ for computing the feed-forward compensation value 18 is re-computed from an initial value of zero (at step 44 of FIG. 2). In an alternative embodiment, the RRO estimate $\hat{S}$ is initialized (at step 44 of FIG. 2) to the previously computed value, and then the RRO estimate $\hat{S}$ updated recursively using the equation of FIG. 1C.

We claim:

1. A disk drive comprising:
   (a) a disk comprising a plurality of data tracks, wherein each data track comprises a plurality of data sectors and a plurality of embedded servo sectors;
   (b) an actuator arm;
   (c) a head coupled to a distal end of the actuator arm;
   (d) a voice coil motor (VCM) for rotating the actuator arm about a pivot in order to actuate the head over the disk; and
   (e) control circuitry for generating a control signal applied to the VCM in response to a position error signal (PES) generated from reading the embedded servo sectors and a feed-forward compensation value that compensates for a repeatable runout (RRO) disturbance, the feed-forward compensation value generated for each servo sector in response to an RRO estimate $\hat{S}$ computed recursively for each servo sector according to:

$$\hat{S}_{n+1} = \hat{S}_n - \lambda\left[\hat{S}_n - \frac{1}{n}\sum_{i=1}^{n} PES_i\right]$$

wherein:
$\lambda$ is a predetermined fraction;
$PES_i$ is the position error signal generated for a selected servo sector during an ith revolution of the disk; and
$n$ represents a number of disk revolutions.

2. The disk drive as recited in claim 1, wherein the RRO estimate $\hat{S}$ is computed recursively over a predetermined number of disk revolutions.

3. The disk drive as recited in claim 1, wherein the RRO estimate $\hat{S}$ is computed recursively over a number of disk revolutions until the change in the RRO estimate $\hat{S}$ falls below a predetermined threshold.

4. The disk drive as recited in claim 1, wherein:
   (a) the disk comprises a plurality of zones, wherein each zone comprises a plurality of the data tracks; and
   (b) the RRO estimate $\hat{S}$ is computed for each data track in each zone using a $\lambda$ corresponding to each zone.

5. The disk drive as recited in claim 1, wherein the RRO estimate $\hat{S}$ is computed recursively for each data track during a manufacturing process.

6. The disk drive as recited in claim 1, wherein the RRO estimate $\hat{S}$ is computed recursively for a selected data track if the PES generated for the selected data track exceeds a predetermined threshold during normal operation of the disk drive.

7. A method of operating a disk drive, the disk drive comprising a disk having a plurality of data tracks, wherein each data track comprises a plurality of data sectors and a plurality of embedded servo sectors, an actuator arm, a head coupled to a distal end of the actuator arm, and a voice coil motor (VCM) for rotating the actuator arm about a pivot in order to actuate the head over the disk, the method comprising the steps of:
   (a) generating a control signal applied to the VCM in response to a position error signal (PES) generated from reading the embedded servo sectors and a feed-forward compensation value that compensates for a repeatable runout (RRO) disturbance; and
   (b) generating the feed-forward compensation value for each servo sector in response to an RRO estimate $\hat{S}$ computed recursively for each servo sector according to:

$$\hat{S}_{n+1} = \hat{S}_n - \lambda\left[\hat{S}_n - \frac{1}{n}\sum_{i=1}^{n} PES_i\right]$$

wherein:
$\lambda$ is a predetermined fraction;
$PES_i$ is the position error signal generated for a selected servo sector during an ith revolution of the disk; and
$n$ represents a number of disk revolutions.

8. The method as recited in claim 7, wherein the RRO estimate $\hat{S}$ is computed recursively over a predetermined number of disk revolutions.

9. The method as recited in claim 7, wherein the RRO estimate $\hat{S}$ is computed recursively over a number of disk revolutions until the change in the RRO estimate $\hat{S}$ falls below a predetermined threshold.

10. The method as recited in claim 7, wherein:
(a) the disk comprises a plurality of zones, wherein each zone comprises a plurality of the data tracks; and
(b) the RRO estimate $\hat{S}$ is computed for each data track in each zone using a $\lambda$ corresponding to each zone.

11. The method as recited in claim 7, wherein the RRO estimate $\hat{S}$ is computed recursively for each data track during a manufacturing process.

12. The method as recited in claim 7, wherein the RRO estimate $\hat{S}$ is computed recursively for a selected data track if the PES generated for the selected data track exceeds a predetermined threshold during normal operation of the disk drive.

* * * * *